United States Patent
Diaz-Cuellar et al.

(10) Patent No.: US 9,075,985 B2
(45) Date of Patent: Jul. 7, 2015

(54) RESTRICTED TRANSMOGRIFYING DRIVER PLATFORM

(71) Applicant: Microsoft Corporation, Redmond, WA (US)

(72) Inventors: Gerardo Diaz-Cuellar, Redmond, WA (US); Dhiraj Kant Gupta, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 13/906,902

(22) Filed: May 31, 2013

(65) Prior Publication Data

US 2014/0359706 A1 Dec. 4, 2014

(51) Int. Cl.
| | |
|---|---|
| *G06F 21/00* | (2013.01) |
| *G06F 21/45* | (2013.01) |
| *H04L 29/06* | (2006.01) |
| *G06F 21/50* | (2013.01) |
| *G06F 21/12* | (2013.01) |
| *G06F 21/53* | (2013.01) |
| *G06F 21/62* | (2013.01) |
| *G06F 21/70* | (2013.01) |

(52) U.S. Cl.
CPC .............. *G06F 21/45* (2013.01); *H04L 63/08* (2013.01); *G06F 21/62* (2013.01); *G06F 21/50* (2013.01); *G06F 21/70* (2013.01); *G06F 21/12* (2013.01); *G06F 21/53* (2013.01)

(58) Field of Classification Search
USPC .......... 726/1–4, 16, 17, 21–30; 709/217–237; 719/321–327
See application file for complete search history.

(56) References Cited

U.S. PATENT DOCUMENTS 7,603,484 B2 * 10/2009 Dai et al. ........................ 710/5
7,941,813 B1    5/2011 Protassov et al.
(Continued)

FOREIGN PATENT DOCUMENTS

WO        99/39254 A2    8/1999

OTHER PUBLICATIONS iKernel: Isolating Buggy and Malicious Device Drivers Using Hardware Virtualization Support by Tan et al; Publisher: IEEE; Year: 2007.*

(Continued)

*Primary Examiner* — Madhuri Herzog
(74) *Attorney, Agent, or Firm* — John Jardine; Kate Drakos; Micky Minhas

(57) ABSTRACT

A restricted transmogrifying driver platform is described herein. In one or more implementations, a platform is provided that enables a restricted execution environment for virtual private network (VPN) drivers and other transmogrifying drivers. The platform may be implemented as an operating system component that exposes an interface through which drivers may register with the platform and be invoked to perform functions supported by the platform. The restricted execution environment places one or more restrictions upon transmogrifying drivers that operate via the platform. For instance, execution may occur in user mode on a per-user basis and within a sandbox. Further, the platform causes associated drivers to run as background processes with relatively low privileges. Further, the platform may suspend the drivers and control operations of the driver by scheduling of background tasks. Accordingly, exposure of the transmogrifying drivers to the system is controlled and limited through the platform.

20 Claims, 6 Drawing Sheets

(56) References Cited

U.S. PATENT DOCUMENTS

| | | | |
|---|---|---|---|
| 8,775,802 B1* | 7/2014 | Kargman et al. | 713/166 |
| 2004/0252325 A1* | 12/2004 | Lawrence | 358/1.15 |
| 2006/0242270 A1 | 10/2006 | Sankaranarayan et al. | |
| 2006/0259675 A1 | 11/2006 | Talluri et al. | |
| 2007/0079385 A1* | 4/2007 | Williams et al. | 726/27 |
| 2007/0088890 A1* | 4/2007 | Wieland et al. | 710/269 |
| 2008/0005791 A1* | 1/2008 | Gupta et al. | 726/15 |
| 2010/0057774 A1 | 3/2010 | Pizano et al. | |
| 2010/0082926 A1 | 4/2010 | Sahita et al. | |
| 2011/0067105 A1 | 3/2011 | Wolfe et al. | |

OTHER PUBLICATIONS

Tan, Lin, et al. "iKernel: Isolating buggy and malicious device drivers using hardware virtualization support." Dependable, Autonomic and Secure Computing, 2007. DASC 2007. Third IEEE International Symposium on. IEEE, 2007.*

Swift, Michael M., et al. "Nooks: An architecture for reliable device drivers." Proceedings of the 10th workshop on ACM SIGOPS European workshop. ACM, 2002.*

Herder, Jorrit N., et al. "Fault isolation for device drivers." Dependable Systems & Networks, 2009. DSN'09. IEEE/IFIP International Conference on. IEEE, 2009.*

Introduction to the WDF User-Mode Driver Framework by Microsoft. Date: May 16, 2006.*

"Introducing Sandboxie", Retrieved at <<http://www.sandboxie.com/>>, Retrieved Date: Apr. 15, 2013, pp. 3.

Das, et al., "PRISM: Platform for Remote Sensing using Smartphones", Retrieved at <<http://research.microsoft.com/pubs/131575/mobi096-das.pdf>>, In Proceedings of the 8th Annual International Conference on Mobile Systems, Applications and Services, Jun. 15, 2010, pp. 14.

"Sandbox", Retrieved at <<http://www.chromium.org/developers/design-documents/sandbox>>, Dec. 15, 2009, pp. 8.

Huang, et al., "Framework for Building, a Low-Cost, Scalable,and Secured Platform for Web-Delivered Business Services", Retrieved at <<http://ieeexplore.ieee.org/stamp/stamp.jsp?tp=&arnumber=5643225>>, In IBM Journal of Research and Development, vol. 54, Issue 6, Nov. 2010, pp. 14.

Sellers, Dennis, "Boinx Software wants you to Clean up Your Mac OS X Sandbox", Retrieved at <<http://appledailyreport.com/2013/04/11/boinx-software-wants-you-to-clean-up-your-mac-os-x-sandbox/>>, Apr. 11, 2013, pp. 2.

"International Search Report & Written Opinion for PCT Patent Application No. PCT/US2013/060753", Mailed Date: Jan. 24, 2014, Filed Date: Sep. 20, 2013, 10 Pages.

"iOS App Programming Guide Contents", Published on: Apr. 23, 2013, Available at: http://web.archive.org/web/20130513192701/https://developer.apple.com/library/ios/documentation/iPhone/Conceptual/iPhoneOSProgrammingGuide/iPhoneAppProgrammingGuide.pdf.

"VPN Express-Best Mobile VPN Solution for Blocked Websites", Published on: Mar. 7, 2013, Available at: http://web.archive.org/web/20130307232341/https://itunes.apple.com/us/app/vpn-express-best-mobile-vpn/id375584677?mt=8.

* cited by examiner

RESTRICTED TRANSMOGRIFYING DRIVER PLATFORM

BACKGROUND

Currently, transmogrifying drivers that effectuate transformations of underlying data from one form to another, such as virtual private network (VPN) drivers, may have system wide privileges, high priority, and access to sensitive data and therefore may pose considerable security risks. Due in part to these concerns users may be reluctant to install such drivers and associated software on their devices. For example, users may be unwilling to download and install a VPN plugin from an online application store due to the presumed risks of this type of product. Accordingly, commerce and distribution of products that contain such transmogrifying drivers may be hampered.

SUMMARY

A restricted transmogrifying driver platform is described herein. In one or more implementations, a platform is provided that enables a restricted execution environment for virtual private network (VPN) drivers and other transmogrifying drivers. The platform may be implemented as an operating system component that exposes an interface through which drivers may register with the platform and be invoked to perform functions supported by the platform. The restricted execution environment places one or more restrictions upon transmogrifying drivers that operate via the platform. For instance, execution may occur in user mode on a per-user basis and within a sandbox. Further, the platform causes associated drivers to run in background processes with relatively low privileges. Further, the platform may suspend the drivers and control operations of the drivers by scheduling of background tasks. Accordingly, exposure of the transmogrifying drivers to the system is controlled and limited through the platform.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Due in part to security concerns with virtual private network (VPN) drivers and other transmogrifying drivers, users may be reluctant to install products that employ transmogrifying drivers on their devices. Accordingly, commerce and distribution of products that contain such transmogrifying drivers may be hampered.

A restricted transmogrifying driver platform is described herein. In one or more implementations, a platform is provided that enables a restricted execution environment for virtual private network (VPN) drivers and other transmogrifying drivers. The platform may be implemented as an operating system component that exposes an interface through which drivers may register with the platform and be invoked to perform functions supported by the platform. The restricted execution environment places one or more restrictions upon transmogrifying drivers that operate via the platform. For instance, execution may occur in user mode on a per user basis and within a sandbox. Further, the platform causes associated drivers to run as background processes with relatively low privileges. Further, the platform may suspend the drivers and control operations of the driver by scheduling of background tasks. Accordingly, exposure of the transmogrifying drivers to the system is controlled and limited through the platform.

In the following discussion, an example operating environment is first described that may employ the techniques described herein. Next, example details and techniques are described which may be implemented in the example environment as well as other environments. Consequently, performance of the techniques is not limited to the example environment and the example environment is not limited to performance of the example techniques. Lastly, example systems and devices are described that may be employed to implement one or more embodiments.

Example Operating Environment

Figure 1:
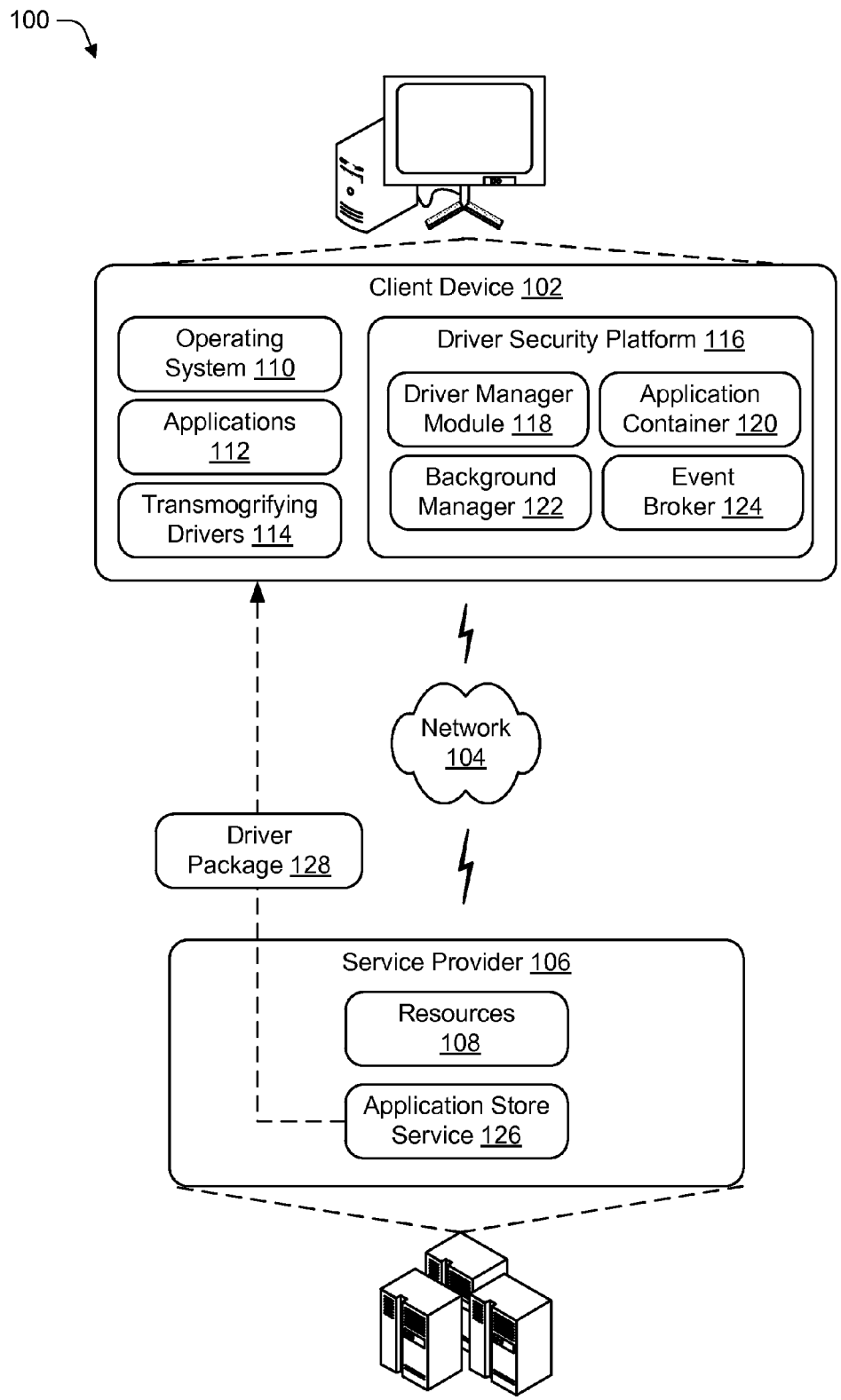
FIG. 1 is an illustration of an environment in accordance with one or more implementations of restricted transmogrifying driver platform techniques.

FIG. 1 is an illustration of an environment 100 in an example implementation that is operable to employ techniques described herein. The illustrated environment 100 includes a client device 102 that is communicatively coupled via a network 104 to a service provider 106. The service provider 106 may be configured to make various resources 108 (e.g. content and services) available over the network 104 to the client device 102 and other clients. Generally, resources 108 made accessible by a service provider 106 may include any suitable combination of services and/or content typically made available over a network by one or more providers. Some examples of services include, but are not limited to, a search service, an email service, an instant messaging service, an online productivity suite, and an authentication service to control access of clients to the resources. Content may include various combinations of text, multi-media streams, documents, application files, photos, audio/video files animations, images, web pages, web applications, device applications, content for display by a browser or other client application, and the like.

The client device 102 and service provider 106 may be implemented by one or more computing devices and also may be representative of one or more entities. A computing device may be configured in a variety of ways. For example, a computing device may be configured as a computer that is capable of communicating over the network, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, hand-held game consoles). Additionally, although a single computing device is shown in some instances, the computing device may be representative of a plurality of different devices, such as multiple servers utilized by the service provider 106.

The client device 102 is further illustrated as including an operating system 110. The operating system 110 is configured to abstract underlying functionality of the underlying hardware to applications 112 that are executable on the client device 102. For example, the operating system 110 may abstract processing, memory, network, and/or display functionality such that the applications 112 may be written without knowing "how" this underlying functionality is implemented. The applications 112, for instance, may provide data to the operating system 110 to be rendered and displayed by a display device without understanding how this rendering will be performed.

In accordance with techniques described herein, the client device 102 is also illustrated as including transmogrifying drivers 114 and a driver security platform 116 that may be configured in various ways to impose restrictions upon operation of the transmogrifying drivers 114. The transmogrifying drivers 114 are representative of various kinds of application modules, plugins, and/or other third-party programs that may be managed and controlled by the driver security platform 116 described herein. Generally, the transmogrifying drivers 114 effectuate transformations of underlying data from one form to another. One example type of transmogrifying drivers is virtual private network (VPN) drivers that transform data packets (e.g., encapsulate/decapsulate) into a proprietary form for secure VPN communications between a VPN client and VPN server. Other examples may include but are not limited to, network interface card drivers to packetize/depacketize data, anti-virus drivers to recognize and handle malware, graphics processing drivers to process/convert graphics, printer drivers to translate application data into a printable format for a printer, and so forth. Techniques discussed herein are also applicable to VPN tunnels and other Internet Protocol (IP) tunnels, data pipes, transport streams, firewalls, and so forth.

In a traditional model, transmogrifying drivers 114 may have system wide privileges, high priority, and access to sensitive data. Generally, transmogrifying drivers are closely coupled to the operating system and are run in kernel mode. Thus, transmogrifying drivers 114 may include and/or be referred to as kernel-mode drivers, system drivers, and/or class drivers. As transmogrifying drivers 114 typically have elevated privileges and full system access in kernel mode, these kinds of drivers pose a considerable security risk and may become targets/implements employed by malicious parities for illegitimate purposes. Transmogrifying drivers 114 that freely operate with unrestricted privileges and access may also negatively impact processing resources and battery life. Moreover, distribution of transmogrifying drivers via an application store or other online channel may be hindered due at least in part to the concerns just enumerated.

However, in accordance with inventive principles described herein, a restricted execution environment may be established to enable execution of transmogrifying drivers 114 in user mode in a restricted manner that alleviates the foregoing concerns. For example, by controlling transmogrifying drivers 114 within a restricted execution environment as discussed above and below, security is imposed on operation of the drivers that is effective to make the system more reliable, decrease resource consumption of driver operations, prevent exploitations of the system via the drivers, enable per-user installations, and accordingly make distribution of drivers through Internet channels a viable option.

In particular, the driver security platform 116 represents functionality of the client device 102 to instantiate a restricted execution environment for transmogrifying drivers 114. Functionally represented by the driver security platform 116 may be implemented in various ways. In some implementations, the driver security platform 116 may be provided as an operating system component, however, the driver security platform 116 may also be implemented as a standalone component as illustrated. As depicted, the driver security platform 116 may include or otherwise make of a driver manager module 118, an application container 120, a background manager 122, and an event broker 124 to implement various aspects of the platform.

The driver manager module 118 represents functionality of the platform to recognize and manage transmogrifying drivers 114 associated with the platform. The driver manager module 118 may control execution of the transmogrifying drivers 114 in user mode on a per-user basis through an application container 120 or "sandbox" established for each driver. The application container 120 defines a limited set of tasks that may be perform for individual drivers and restricts operations to the defined set of tasks. The application container 120 further provides double walled sandboxed isolation meaning access is restricted both from inside the container into the system and from external entities into the container. This prevents external entities from hijacking and/or gaining control over sandboxed drivers within application containers.

The background manager 122 is operable to manage the application containers 120 (and associated drivers) using background processes. This may include but is not limited to instantiating background processes for the containers and handling of task scheduling for background processes. The background processes may be assigned low privilege tokens or comparable control data that conveys relatively few privileges and access rights. In other words, the driver security platform 116 associates a relatively low priority with transmogrifying drivers 114 that limits access and/or freedom of operation. The background manager 122 may also cause suspension of the background processes for transmogrifying drivers 114 when not in use, which further restricts the ability of transmogrifying drivers to perform work other than at the specific direction of the user and/or driver security platform 116. For example, a transmogrifying driver 114 may be suspended other than when a set of tasks specifically defined for the driver or type of driver are being performed at the direction of the driver manager module 118.

The background manager 122 may be implemented as a component of the driver security platform 116 as illustrated. Alternatively, the background manager 122 may be configured as operating system (OS) component designed to manage and coordinate operations of a plurality of applications 112 using background processes including the transmogrifying drivers 114. In this approach, the driver security platform 116 may be configured to interact with the background manager 122 to take advantage of integrated functionality of the OS to support background operation of applications.

The event broker 124 represents functionality to generate events to broker interaction between a driver and system services to perform designated tasks that are enabled with respect to a transmogrifying driver and the corresponding application container 120. In particular, the event broker 124 may operate to produce events that cause performance of tasks that are scheduled by the background manager 122. In some implementations, this involve generating appropriate calls to code entry points such as system application programming interfaces (APIs) or other suitable interfaces. The event broker 124 may be further configured to produce events to broker interactions with user interface elements exposed by the computing device, such as display screen and UIs associated with the OS, a browser, a VPN client application, and/or other applications. A transmogrifying driver that is "sandboxed" in the manner described may be restricted from direct manipulation of UI components and elements. Accordingly, the event broker 124 may operate as a surrogate that enables interaction and coordination with UI components on behalf of the transmogrifying drivers 114 without undue security exposure.

As further illustrated in FIG. 1, the service provider 106 may be configured to manage and provide client access to an application store service 126. The application store service 126 represents a particular one of the resources 108 that may be provided by a service provider 106 to clients over the network 104. The application store service 126 is configured to enable user access to an online application database (e.g., an application marketplace) to browse, select, purchase, and/or download applications. Applications from a variety of developers may be made available to clients through application store service 126.

In accordance with techniques discussed herein, the application store service 126 may be selected as a distribution mechanism for transmogrifying drivers 114 that are controlled via a driver security platform 116. This is made possible due to the additional security measures, restrictions, and performance gains that are attained using the restricted execution environment(s) instantiated for driver via the driver security platform 116. In one approach, transmogrifying drivers 114 may be packaged for inclusion in the application marketplace in a designated, known format associated with the driver security platform 116. A driver package 128 containing a corresponding transmogrifying driver 114 in the designated format may be made available via the application store service 126 and may be downloaded for use by a client device 102 over the network 104 as represented in FIG. 1. In one approach, the driver package 128 may employ a proprietary format (such as .appx or another comparable store specific or provider specific format) associated with the application store service 126. In addition or alternatively, the package may be configured to contain an identifier, key, code, file extension, or other suitable identifying data to facilitate recognition of the driver package 128 as containing a transmogrifying driver that is supported by the driver security platform 116.

At the time of installation, the driver security platform 116, by way of the driver manager module 118 or otherwise, may recognize the driver package 128 and/or format as being associated with the driver security platform 116 based on suitable identifying data included with the package. Accordingly, in response to installation of a driver package 128 in the recognized format, the driver manager module 118 may operate to register the corresponding transmogrifying driver with the platform and thereby effectuate the restrictions and additional security for the driver enabled through the driver security platform 116.

Figure 2:
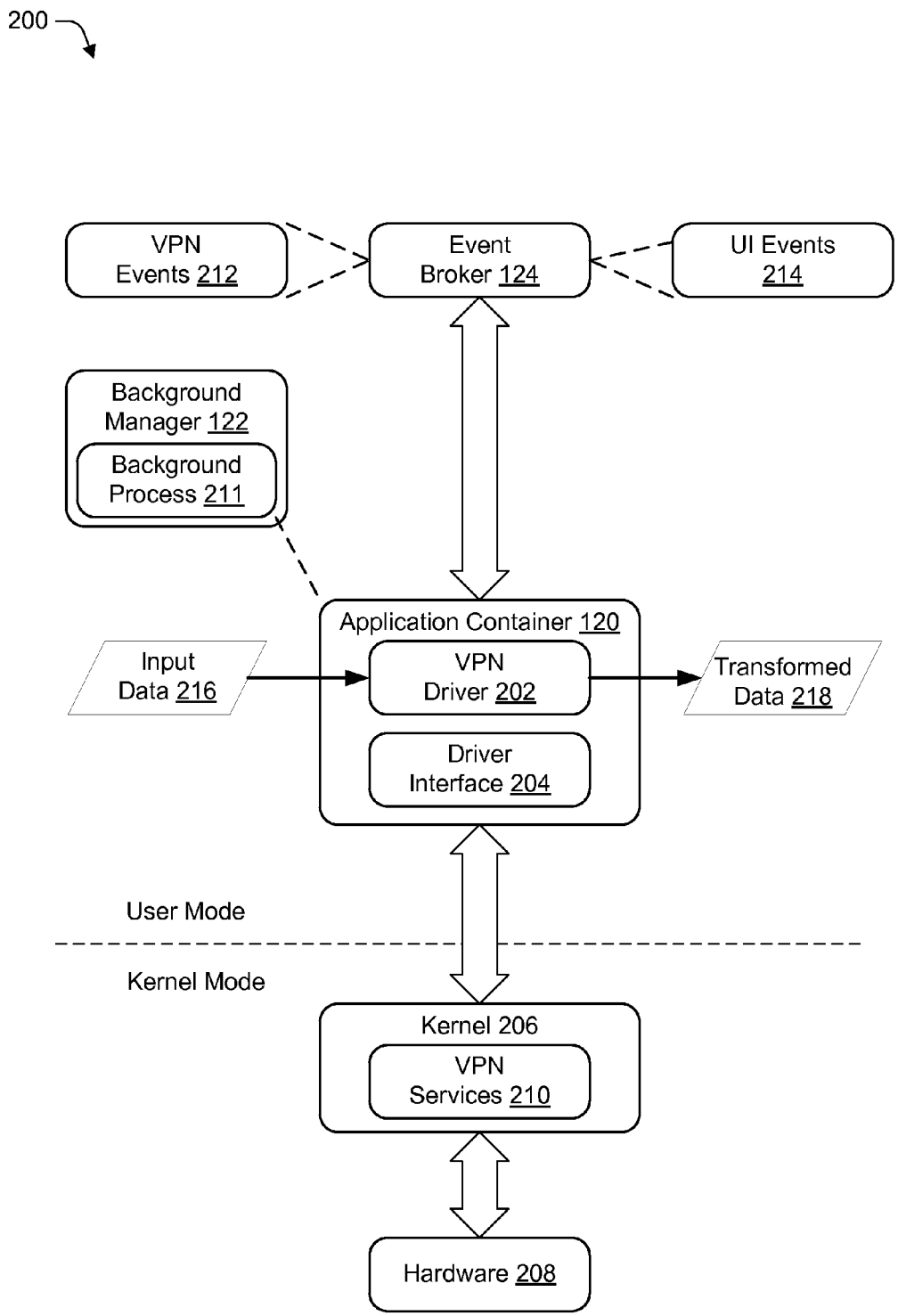
FIG. 2 is an illustration of an example scenario in accordance with one or more implementations.

Additional details regarding these and other aspects of a restricted transmogrifying driver platform are discussed in relation to the example use scenario depicted in FIG. 2, generally at 200. In this example, an application container 120 or sandbox is illustrated as containing a virtual private network (VPN) driver 202, although other drivers, plug-ins, and code are also contemplated as noted herein. The application container 120 is configured to enable a limited set of tasks for the contained driver, which in this case happens to be a VPN driver 202. In this VPN scenario, the enabled tasks may be restricted to connect, disconnect, encapsulate, and/or decapsulate operations associated with VPN communications with a VPN server over a network. Other types of drivers and code may be associated with corresponding operations that are enabled by the platform to support the core functionality thereof, while minimizing access and performance impact. A permissible set of tasks may be associated with each type of driver and/or on an individual driver-by-driver basis. As noted, the application container 120 effectively restricts a driver to the particular set of tasks enabled for the driver through the platform.

FIG. 2 also represents division of various components between user mode and kernel mode. Generally, a processing system of a computing device may switch between user mode and kernel mode depending on the type of code that is executed. Typically, desktop applications run in user mode, and core operating system components run in kernel mode. Drivers/code that operate in kernel mode may share a common memory allocation and are not isolated from other drivers/code or OS resources. As noted, transmogrifying drivers are traditionally implemented as kernel-mode drivers that have substantially unrestricted access to the OS and the potential to cause system wide crashes. In accordance with techniques described herein, though, transmogrifying drivers may instead be executed in user mode via a suitable restricted execution environment.

In particular, the application container 120 and VPN driver 202 contained therein are depicted in FIG. 2 as being executed in user mode. The VPN driver 202 may interact with core services and functionality of the operating system 110 that are provided by the kernel 206 via a driver interface 204. The kernel 206 generally implements a software abstraction of underlying hardware 208 to facilitate operation of the hardware by software components. The driver interface 204 may represent one or more application programming interfaces (APIs) or other suitable interfaces associated with the operating system 110 through which core services and functionality represented by the kernel 206 are made accessible to code executed in user mode.

In the particular example, the core services and functionality include at least VPN services 210 to facilitate VPN communications. The VPN services 210 may correspond to the enabled set of tasks for the VPN driver 202, which may be configured to invoke the services via appropriate calls and callbacks supported by the driver interface. The driver interface 204 may be instantiated within the application container 120 as depicted or as a standalone component. Functionality represented by the driver interface 204 may also be divided between a user-mode component and a corresponding component of the kernel 206 that operates in kernel mode. Interactions via the driver interface 204 may be controlled via the driver security platform via the driver manager module 118 or otherwise.

In operation, the background manager122 may set-up a background process 211 for the application container 120 and manage execution of the VPN driver 202 using the background process 211. Tasks may be scheduled at the direction of the platform. Generally, this occurs at the explicit direction of a user (e.g., a user selection or user consent) or in accordance with a profile established based on user input. The profile may define the set of tasks available to the VPN driver 202 in the application container 120 and set the associated privileges and access rights accordingly. The platform then operates to enforce restrictions indicated by the profile using the application container 120. The profile, for example, may indicate that user consent is to be obtained each time particular operations are performed (e.g., for each instance of an operation), in which case a notification and prompt for user consent may be generated to selectively control the particular operations. The profile may also indicate global or default user consent to allow some selected operations to occur automatically without a further indication of consent for each instance. In the absence of user consent, the application container 120 operates to prevent the driver from performing restricted tasks. In other words, the restricted execution environment is configured to selectively enable operations of transmogrifying drivers in dependence upon user consent. Thus, the user is provided ultimate control over the scope of interactions enabled for transmogrifying drivers 114 that are managed via the platform.

FIG. 2 further illustrates interaction of the application container 120 with the event broker 124. In particular, the event broker 124 may operate to produce VPN events 212 and/or user interface events 214 on behalf of the VPN driver that cause performance of tasks scheduled via the background manager 122. For example, VPN events 212 may include calls directed to the driver interface 204 to invoke VPN services 210. Additionally, the event broker 124 may produce user interface events 214 to manipulate UI components for the operating system 110, an application 112, or other UI. This may include but is not limited to output of notifications to obtain user consent for scheduled tasks in appropriate circumstances.

In this manner, a restricted execution environment may be implemented to control operation of the VPN driver 202 and/or other transmogrifying drivers traditionally executed in kernel mode. Such drivers generally accept input data 216 in a particular form and process the data to produce transformed data 218 in a different form as represented in FIG. 2. For example, the VPN driver 202 of FIG. 2 may operate to encapsulate data packets into a proprietary format for secure VPN communications to a corporate server. The VPN driver 202 may also be configured to decapsulate data packets obtained from the corporate server in the proprietary format into data that is consumable by a client device 102. Other types of drivers are configured to perform comparable data transformations tied to the intended functionality of the drivers. For instance, a printer driver converts data for printing, a network interface card driver operates to packetize and depacketize data, an antivirus driver may scan files and compare files to known signatures, and so forth.

Thus, a driver security platform may be provided that enables a restricted execution environment configured to enforce various restrictions for VPN drivers as well as other transmogrifying drivers. The platform may be implemented as an operating system component that exposes an interface through which drivers may register with the platform and be invoked to perform tasks supported and/or enabled by the platform. Transmogrifying drivers may be executed via the platform in user mode, on a per-user basis, and within a "sandboxed" application container that restricts privileges and system access of the transmogrifying drivers.

Having considered the foregoing discussion of an example operating environment, consider now details regarding techniques for a restricted transmogrifying driver platform described in relation to the following example procedures.

Example Procedures

Figure 3:
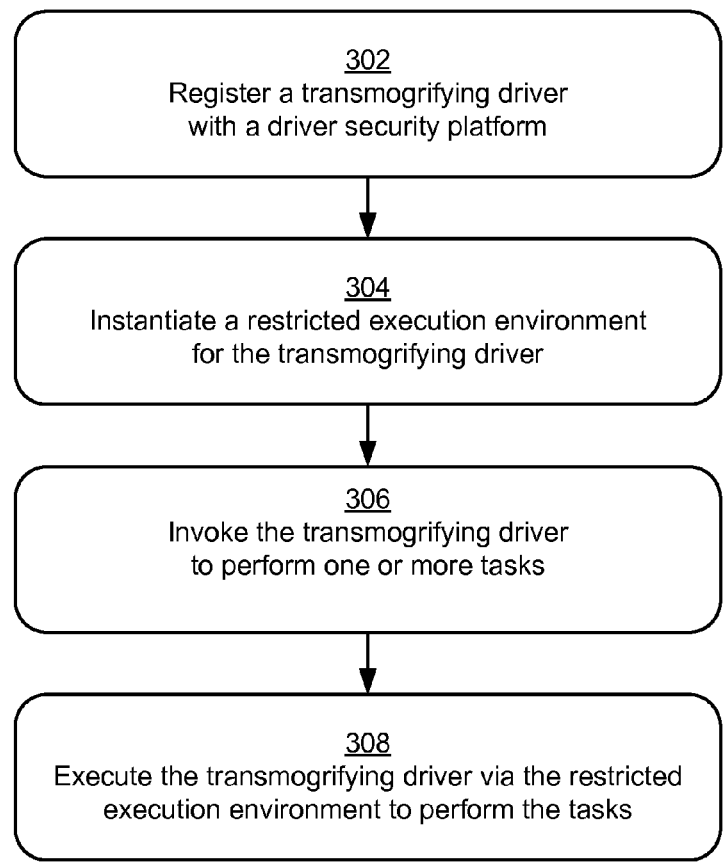
FIG. 3 is a flow diagram depicting an example procedure for employing a restricted execution environment for execution of a transmogrifying driver.
Figure 4:
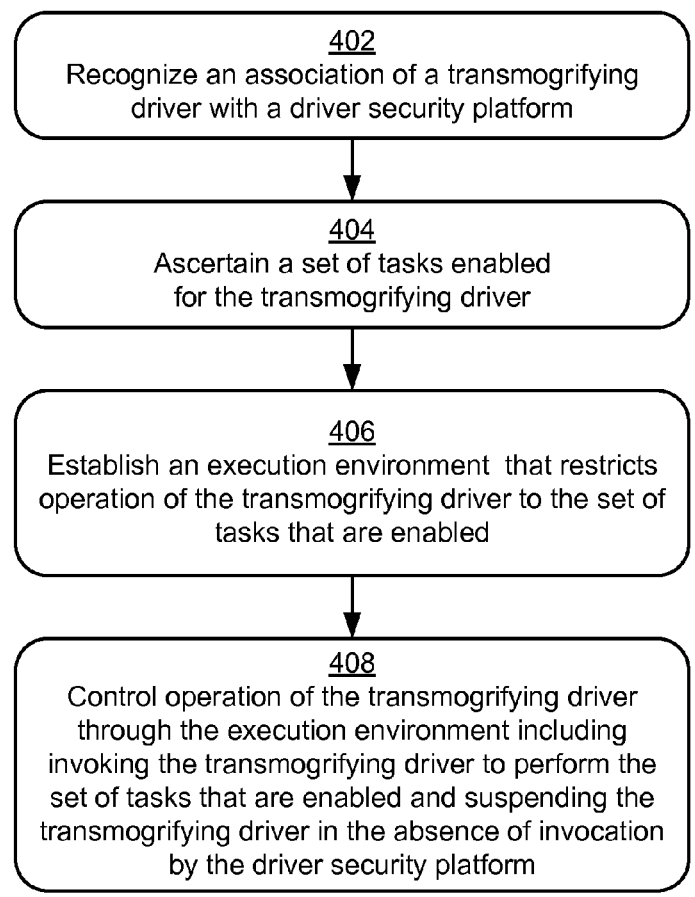
FIG. 4 is a flow diagram depicting an example procedure in which operation of a transmogrifying driver is controlled.
Figure 5:
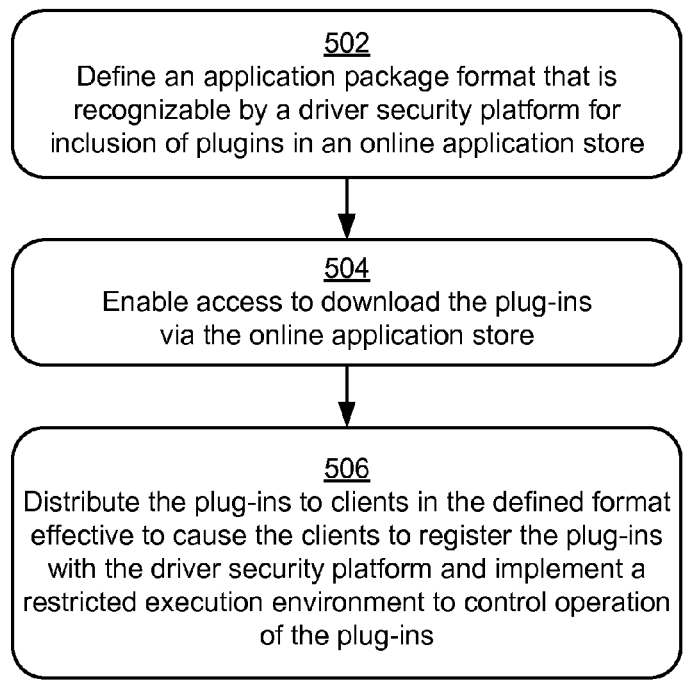
FIG. 5 is a flow diagram depicting an example procedure in which transmogrifying drivers are distributed via an online application store.

This section discusses details of techniques for a restricted transmogrifying driver platform with reference to example procedures of FIGS. 3-5. In portions of the following discussion reference may be made to the example operating environment of FIG. 1 in which various aspects may be implemented. Aspects of each of the procedures described below may be implemented in hardware, firmware, or software, or a combination thereof. The procedures are shown as a set of blocks that specify operations performed by one or more devices and are not necessarily limited to the orders shown for performing the operations by the respective blocks. In at least some implementation the procedures may be performed by a suitably configured computing device, such as the example client device 102 of FIG. 1 that includes or makes use of a driver security platform 116 or comparable functionality.

FIG. 3 is a flow diagram depicting an example procedure 300 for employing a restricted execution environment for execution of a transmogrifying driver. A transmogrifying driver is registered with a driver security platform (block 302). For example, a driver manager module 118 may be configured to recognize drivers that are packaged in a designated format. The package for instance may include a suitable identifier to indicate to the driver security platform that the driver is designed for the platform and is to be controlled via the platform. Thus, upon installation of the driver, the driver manager module 118 detects the package and/or identifier and registers the driver for handling via the system. Subsequently, operations of the driver are managed by the driver security platform with corresponding restrictions.

A restricted execution environment is instantiated for the transmogrifying driver (block 304) and the transmogrifying driver is invoked to perform one or more tasks (block 306). Then, the transmogrifying driver is executed via the restricted execution environment to perform the tasks (block 308). Here, the driver manager module 118 may establish a restricted execution environment for a particular driver when the driver is executed. The restricted execution environment may comprise an application container 120 (e.g., "sandbox") as previously discussed. The restricted execution environment imposes various restrictions upon the operation of a transmogrifying driver that are applied during execution. For example, the restricted execution environment isolates a corresponding driver to restrict access to system resources. In particular, access may be restricted to a designated set of tasks associated with functionality of the driver. The driver is invoked by the system to perform the tasks and may be unable to initiate tasks on its own. For example, the restricted execution environment may prevent the driver from creating objects on its own. Instead, objects for particular tasks are created by the platform and passed into the restricted execution environment for use by the driver.

The driver may also be executed via the restricted execution environment as a background task and may be assigned a privilege token that conveys limited privileges and access rights. A background process associated with the restricted execution environment may be suspended in the absence of specific direction by the platform and/or a user to perform work. Additionally, the restricted execution environment denies applications and other components that are not associated with the driver security platform access to the transmogrifying driver to prevent tampering and/or hijacking of the driver.

Additionally, the driver is executed in user mode as previously discussed and may also be installed on a per user basis. Accordingly, different users can install different drivers for use on the same client device and/or for the same purpose.

This may facilitate use of different hardware or different software version in accordance with user preferences. Since the drivers are sandboxed in user mode, installation and uninstallation of one driver does not affect the experience of other users. In reference to VPN technology for example, different users of the same device could employ different VPN drivers to connect to respective VPN servers of different employers without adversely affecting one another.

Further, drivers implemented using the described techniques may be easily and completely removed without leaving residual files, data, settings and properties that may cause instability or unintended behavior. This is possible because the restricted execution environment provides individualized allocation of storage for exclusive use by a respective driver. The driver may not have access to write data or settings elsewhere. Accordingly, cleaning-up the driver and state is easily accomplished by deleting the data contained in the allocated storage associated with the driver.

FIG. 4 is a flow diagram depicting an example procedure in which operation of a transmogrifying driver is controlled. An association is recognized of a transmogrifying driver with a driver security platform (block 402). For example, a transmogrifying driver may be registered with a driver security platform 116 as previously discussed. Operation of the driver is subsequently handled through the driver security platform 116 in a controlled manner. The association may be established at the time of installation based on the driver being configured in a designated format or package. As noted, a .appx format is one suitable format that may be used to associate drivers with the platform although other file types, names, and identifying information are also contemplated.

A set of tasks enabled for the transmogrifying driver is ascertained (block 404). The set of tasks enabled may be based upon an identification of the driver as a particular type of driver (e.g., VPN vs. printer vs. antivirus, etc.) and/or an individual identification of each particular driver (e.g., distinguish between drivers of the same type associated with different manufacturers/providers). The platform may therefore support and enable a designated set of tasks for each individual driver and/or on the basis of driver type. The set of tasks may be particular contracts that the operating system exposes and enables the drivers to fulfill. Thus, upon identification of a given driver, the platform knows the kinds of tasks the driver is able to perform, enables those tasks, and may prevent the driver from performing other tasks.

In particular, an execution environment is established that restricts operation of the transmogrifying driver to the set of tasks that are enabled (block 406). For example, a restricted execution environment may be established in the manner previously described. The restricted execution environment enables certain tasks or contracts, but otherwise prevents a driver from accessing operating system resources or performing tasks that the driver is not explicitly authorized to perform by the driver security platform.

Then, operation of the transmogrifying driver is controlled through the execution environment including invoking the transmogrifying driver to perform the set of tasks that are enabled and suspending the transmogrifying driver in the absence of invocation by the driver security platform (block 408). Again, the transmogrifying driver executed via a restricted execution environment is invoked by the platform rather than being able to initiate tasks on its own. The driver may be kept in a suspended state when it is not actively being invoked to perform tasks. This may occur by way of a background process 211 that is unsuspended to enable work and then returned to suspended state upon completion of the work. Thus, the work performed by the driver occurs at the direction of the platform and/or user. The driver is generally unable to perform tasks other than those designated for the driver by the platform. The driver is also unable to operate unless called upon by platform, which prevents drivers from freely consuming system resources and battery life.

FIG. 5 is a flow diagram depicting an example procedure in which transmogrifying drivers are distributed via an online application store. An application package format is defined that is recognizable by a driver security platform for inclusion of plugins in an online application store (block 502). For example, plugins such as transmogrifying drivers 114 and other code from third party providers may be encoded in a driver package 128 that employs a designated format defined for the driver security platform 116. Developers may use the designated format to take advantage of the driver security platform 116 and signal the platform to handle their code/drivers via the platform accordingly. The driver package 128 may be configured to facilitate inclusion in an application marketplace, such as via the application store service 126 using a .appx format or other designated format.

Access is enabled to download the plug-ins via the online application store (block 504). Then, the plug-ins are distributed to clients in the defined format effective to cause the clients to register the plug-ins with the driver security platform and implement a restricted execution environment to control operation of the plug-ins (block 506). Inclusion of transmogrifying drivers 114 as offerings in an application marketplace is viable in part because of the additional security measures, restrictions, and performance gains attainable via the driver security platform 116, which make it more likely that users will download and install such drivers from an online store. Thus, a driver package 128 containing a corresponding transmogrifying driver 114 in the designated format may be made available via an application store service 126 The driver package 128 may contain suitable identifying data to facilitate recognition of the package by the driver security platform 116. The driver security platform 116 is configured to recognize the driver package 128 upon installation and perform operations as described herein to register the driver, create a restricted execution environment, enforce various restrictions placed on the driver, and so forth.

Having considered some example procedures, consider now a discussion of an example system and device to implement various aspects in accordance with one or more embodiments.

Example System and Device

Figure 6:
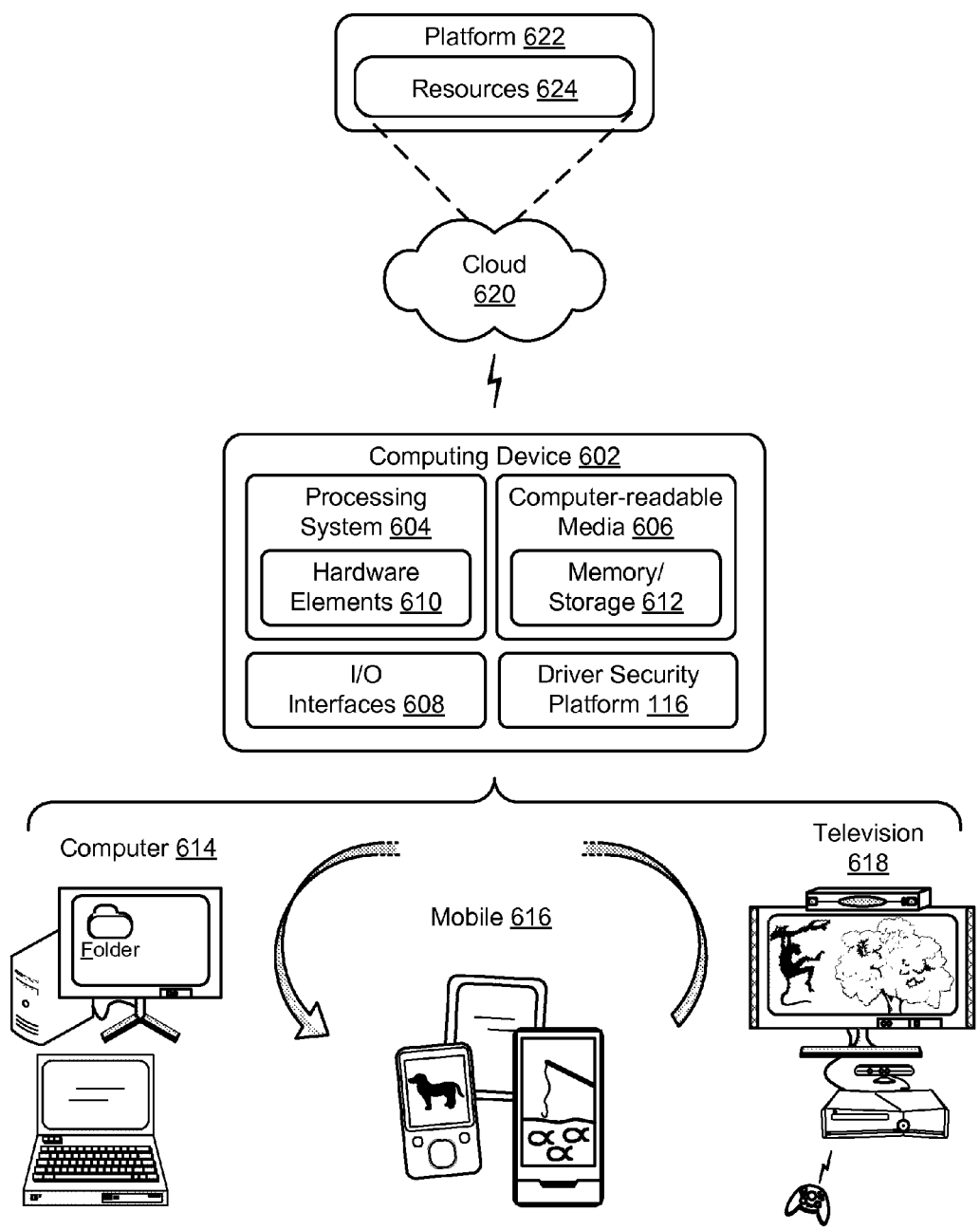
FIG. 6 depicts an example computing system in accordance with one or more embodiments.

FIG. 6 illustrates an example system 600 that includes an example computing device 602 that is representative of one or more computing systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" refers to signal-bearing media configured to transmit instructions to the hardware of the computing device 602, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable media described previously.

Combinations of the foregoing may also be employed to implement various techniques and modules described herein. Accordingly, software, hardware, or program modules including operating system 110, applications 112, driver security platform 116, and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 602 may assume a variety of different configurations, such as for computer 614, mobile 616, and television 618 uses. Each of these configurations includes devices that may have generally different constructs and capabilities, and thus the computing device 602 may be configured according to one or more of the different device classes. For instance, the computing device 602 may be implemented as the computer 614 class of a device that includes a personal computer, desktop computer, a multi-screen computer, laptop computer, netbook, and so on.

The computing device 602 may also be implemented as the mobile 616 class of device that includes mobile devices, such as a mobile phone, portable music player, portable gaming device, a tablet computer, a multi-screen computer, and so on. The computing device 602 may also be implemented as the television 618 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This is illustrated through inclusion of the driver security platform 116 on the computing device 602. The functionality of the driver security platform 116 and other modules may also be implemented all or in part through use of a distributed system, such as over a "cloud" 620 via a platform 622 as described below.

The cloud 620 includes and/or is representative of a platform 622 for resources 624. The platform 622 abstracts underlying functionality of hardware (e.g., servers) and software resources of the cloud 620. The resources 624 may include applications and/or data that can be utilized while computer processing is executed on servers that are remote from the computing device 602. Resources 624 can also include services provided over the Internet and/or through a subscriber network, such as a cellular or Wi-Fi network.

The platform 622 may abstract resources and functions to connect the computing device 602 with other computing devices. The platform 622 may also serve to abstract scaling of resources to provide a corresponding level of scale to encountered demand for the resources 624 that are implemented via the platform 622. Accordingly, in an interconnected device embodiment, implementation of functionality described herein may be distributed throughout the system 600. For example, the functionality may be implemented in part on the computing device 602 as well as via the platform 622 that abstracts the functionality of the cloud 620.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
    obtaining a transmogrifying driver contained in a driver package having a designated format associated with a driver security platform;
    recognizing the designated format of the driver package upon installation based at least in part on identifying data included with the driver package;
    in response to said recognizing, registering the transmogrifying driver with the driver security platform implemented by the computing device;
    instantiating a restricted execution environment for the transmogrifying driver via the driver security platform; and
    executing the transmogrifying driver within the restricted execution environment to perform one or more tasks at the direction of the driver security platform.

2. A method as described in claim 1, wherein the transmogrifying driver is executed in user mode.

3. A method as described in claim 1, wherein the transmogrifying driver is executed on a per-user basis.

4. A method as described in claim 1, wherein the restricted execution environment establishes an application container configured to isolate the transmogrifying driver to restrict access by the transmogrifying driver to system resources.

5. A method as described in claim 4, wherein the application container is further configured to deny access to the transmogrifying driver by components that are not associated with the driver security platform.

6. A method as described in claim 1, wherein the restricted execution environment comprises a background process for the transmogrifying driver for which scheduling of tasks is handled by the driver security platform.

7. A method as described in claim 1, wherein the restricted execution environment is configured to suspend the transmogrifying driver in the absence of explicit invocation of the transmogrifying driver to perform tasks by the driver security platform.

8. A method as described in claim 1, wherein the restricted execution environment is configured to selectively enable operations of the transmogrifying driver in dependence upon user consent.

9. A method as described in claim 1,
    wherein said obtaining the transmogrifying driver is performed over a network from an application store of a service provider.

10. A method as described in claim 1, wherein the transmogrifying driver is configured to transform data from one form to another.

11. A method as described in claim 1, wherein the driver security platform is implemented as component of an operating system for the computing device.

12. A method as described in claim 1, wherein the transmogrifying driver comprises a virtual private network (VPN) driver configured to encapsulate and decapsulate packet for VPN communications over a network.

13. One or more computer-readable storage media storing instructions that, when executed by one or more components of a computing device, implement a driver security platform configured to perform operations including:
   obtaining a transmogrifying driver transmogrifying driver contained in a driver package having a designated format associated with a driver security platform;
   recognizing an association of the transmogrifying driver with the driver security platform based at least in part on identifying data included with the driver package;
   in response to said recognizing, ascertaining a set of tasks enabled for the transmogrifying driver through the driver security platform;
   establishing an execution environment that restricts operation of the transmogrifying driver to the set of tasks that are enabled through the driver security platform; and
   controlling operation of the transmogrifying driver through the execution environment that restricts operation of the transmogrifying driver to the set of tasks that are enabled.

14. One or more computer-readable storage media as recited in claim 13, wherein:
   the transmogrifying driver comprises a virtual private network (VPN) driver; and
   the set of tasks that are enabled through the driver security platform for the VPN driver is restricted to connect, disconnect, encapsulate, and decapsulate tasks associated with VPN communications with a VPN server over a network.

15. One or more computer-readable storage media as recited in claim 13, wherein controlling the operation of the transmogrifying driver includes:
   invoking the transmogrifying driver to perform the set of tasks that are enabled; and
   suspending the transmogrifying driver in the absence of direction by the platform to perform tasks.

16. One or more computer-readable storage media as recited in claim 13, wherein controlling the operation of the transmogrifying driver includes scheduling the set of tasks as background tasks that are brokered by the driver security platform.

17. One or more computer-readable storage media as recited in claim 13, wherein the execution environment comprises a sandboxed application container that is executed in user mode on a per-user basis and assigned a low privilege token configured to prevent system access except with respect to the set of tasks that are enabled.

18. A computing system comprising:
   one or more processing components;
   one or more computer-readable storage media storing instructions that, when executed by the one or more processing components, implement a driver security platform that restricts operation of at least one VPN driver including:
      a driver manager module to:
         obtain the VPN driver over a network from an application store of a service provider, the VPN driver contained in a driver package having a designated format associated with the driver security platform;
         recognize the designated format of the driver package upon installation based at least in part on identifying data included with the driver package including an identifier, code, or file extension;
         in response to said recognizing, establish an application container to contain the VPN driver that is executed in user mode on a per-user basis and assigned a low privilege token configured to prevent system access except with respect to a defined set of tasks that are explicitly enabled for the VPN driver by the driver security platform;
      a background manager to:
         instantiate a background process for the application container that contains the VPN driver;
         handle scheduling of the defined set of tasks via the background process; and
         suspended the background process other than when the defined set of tasks are being performed at the direction of the driver manager module; and
      an event broker to produce events to broker interaction between the VPN driver and system services to perform tasks that are scheduled via the background manager module.

19. A computing system as described in claim 18, wherein the events produced by the event broker include user interface (UI) events for brokering of interactions with UI components exposed via the computing device.

20. A computing system as described in claim 18, wherein the defined set of tasks that are explicitly enabled for the VPN driver by the driver security platform include one or more of connect, disconnect, encapsulate, and decapsulate tasks associated with VPN communications with a VPN server over a network.

* * * * *